J. A. Stoddard,
Changing Speed.
Nº 24,159. Patented May 24, 1859.
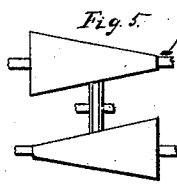
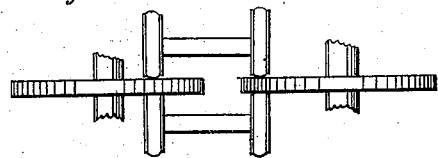
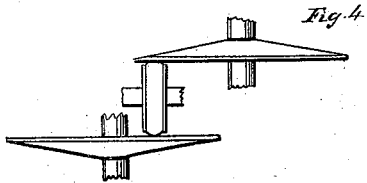
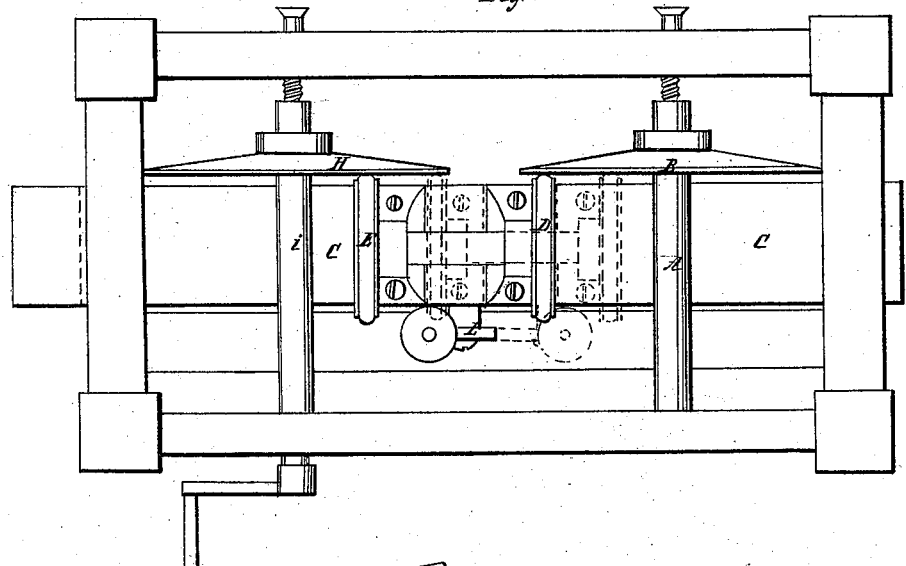
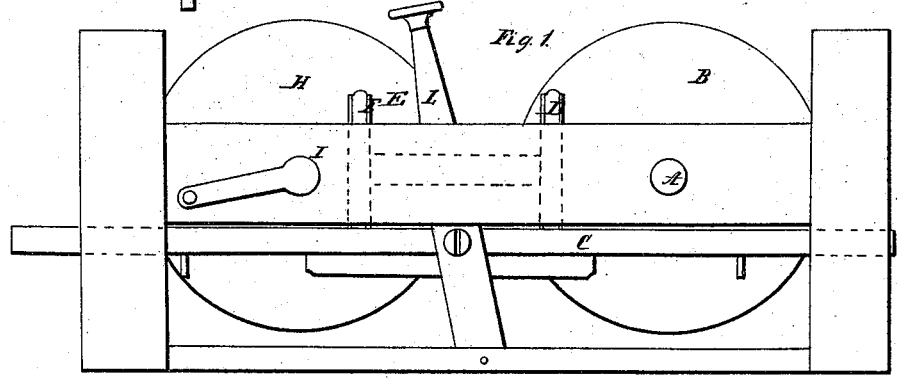
Witnesses:
Geo. W. Stacy
Geo. E. Stacy
Inventor:
J. A. Stoddard

UNITED STATES PATENT OFFICE.

JAMES A. STODDARD, OF MILFORD, MASSACHUSETTS.

IMPROVEMENT IN MECHANISM FOR VARYING SPEED.

Specification forming part of Letters Patent No. 24,159, dated May 24, 1859.

*To all whom it may concern:*

Be it known that I, JAMES A. STODDARD, of Milford, in the county of Worcester and State of Massachusetts, have invented an Improved Form of Mechanism for Graduating Speed; and I hereby declare the following to be a full, clear, and exact description of the construction and operation of the same, reference being had to the accompanying drawings, in which—

Figure 1 is a side view. Fig. 2 is a top view. Figs. 3, 4, and 5 show some variations hereinafter to be explained.

My invention relates to changing or graduating the speed of various machines at will independent of the speed of the driver, and in forms represented by Figs. 1, 2, 3, and 4 consists in placing a wheel or pulley with its axis at right angles, or nearly so, to a plate wheel or driver, on which it is capable of being shifted toward or from the center, and in a similar way arranging a plate to receive the motion from the pulley, excepting being reversed, so that the variation of speed will be increased.

To construct my invention, on the driving-shaft I, Figs. 1 and 2, I place a plate-wheel H, and on the slide-bar C place the pulley E on the other end of axis, the pulley D running against the plate-wheel B on the driven shaft A where motion is to be varied. The urfaces of the pulleys E and D, I cover with a yielding substance, which being pressed against the plates will transmit the motion by its friction. To the slide C, I attach the lever L to operate it. The action is seen on giving motion to I, with the slide and pulleys in the position shown in Fig. 2. The motion given to I will be much faster than that of A, and on shifting the slide C and pulleys E D to the position shown in red ink, Fig. 2, the motion of A is very much increased and much faster than that of I, and consequently any motion between them may be had without the inconvenience of stopping or changing a belt. Fig. 3 shows a variation of arrangement by applying additional pulleys on the other sides of the plate-wheels, and is adapted to places where great power is required, and Fig. 4 shows a form for light work wherein one pulley is made to answer by being placed between two plates.

Fig. 5 shows a form wherein cone-pulleys are used instead of plate-wheels, and the axis of the friction-pulley is parallel with those of the cones, and all operating on the same principles.

I do not claim the use of friction pulleys or surfaces for transmitting or varying motion as such; but What I do claim as new, and desire to secure by Letters Patent, is—

Graduating or varying speed by means of pulleys or their equivalents operated in connection with surface-wheels or their equivalents in such a manner as to receive and transmit the motion at variable distances from their centers, when constructed and operating substantially in the manner above set forth and described.

In witness whereof I have hereunto set my hand in the presence of two witnesses.

J. A. STODDARD.

Witnesses:
GEO. W. STACY,
GEO. E. STACY.